(12) United States Patent
Caillaud et al.

(10) Patent No.: US 11,872,420 B2
(45) Date of Patent: Jan. 16, 2024

(54) REGULATING DEVICE, APPARATUS AND METHOD FOR GENERATING BREATHING GAS

(71) Applicant: L'Air Liquide, Societe Anonyme pour l'Etude et l'Exploitation des Procedes Georges Claude, Paris (FR)

(72) Inventors: Aurelie Caillaud, Voiron (FR); Jean-Michel Cazenave, Seyssins (FR); Alexandre Domenget, Gieres (FR); Alexandre Pentagora, Seyssinet-Pariset (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 931 days.

(21) Appl. No.: 16/760,348

(22) PCT Filed: Aug. 9, 2018

(86) PCT No.: PCT/FR2018/052042
§ 371 (c)(1),
(2) Date: Apr. 29, 2020

(87) PCT Pub. No.: WO2019/086773
PCT Pub. Date: May 9, 2019

(65) Prior Publication Data
US 2021/0178196 A1     Jun. 17, 2021

(30) Foreign Application Priority Data
Oct. 30, 2017   (FR) ...................................... 1760210

(51) Int. Cl.
*A62B 7/00*     (2006.01)
*A62B 7/14*     (2006.01)
(Continued)

(52) U.S. Cl.
CPC ................ *A62B 7/14* (2013.01); *A62B 9/022* (2013.01); *B64D 10/00* (2013.01); *B64D 2010/005* (2013.01); *B64D 2231/025* (2013.01)

(58) Field of Classification Search
CPC .......... A62B 7/14; A62B 9/022; B64D 10/00; B64D 2010/005; B64D 2231/025
See application file for complete search history.

(56) References Cited

U.S. PATENT DOCUMENTS

| 3,190,287 A | 6/1965 | Miller, Jr. |
| 3,952,773 A | 4/1976 | Hahn |
| (Continued) | | |

FOREIGN PATENT DOCUMENTS

| DE | 24 04 062 | 7/1975 |
| EP | 0 499 505 | 8/1992 |
| (Continued) | | |

OTHER PUBLICATIONS

International Search Report and Written Report for PCT/FR2018/052042, dted Nov. 27, 2018.
(Continued)

*Primary Examiner* — Steven O Douglas
(74) *Attorney, Agent, or Firm* — Justin K. Murray

(57) ABSTRACT

A device for regulating breathing gas delivered to a user, comprising a gas circuit comprising a main line having at least an upstream end intended to be connected to at least one gas source and a downstream end intended to be connected to at least one user station such as a mask, the main line comprising at least one electromechanical control valve configured to regulate the gas pressure between the upstream and the downstream, the circuit comprising a secondary line comprising an upstream end intended to be connected to at least one gas source and a downstream end intended to be connected to the same user station(s), the (Continued)

secondary line comprising at least one auxiliary member for regulating the gas flow, the device comprising a switching system configured to control the flow of gas between the upstream and the downstream of the circuit via the main line or via the secondary line, characterized in that the auxiliary member for regulating the secondary line is a pneumatic pressure regulator.

20 Claims, 1 Drawing Sheet

(51) Int. Cl.
    *A62B 9/02*         (2006.01)
    *B64D 10/00*      (2006.01)

(56) References Cited

U.S. PATENT DOCUMENTS

| | | |
|---|---|---|
| 4,148,311 A | 4/1979 | London et al. |
| 4,651,728 A | 3/1987 | Gupta et al. |
| 5,193,531 A | 3/1993 | Zpata et al. |
| 5,261,457 A | 11/1993 | Zapata et al. |
| 9,068,501 B2 | 6/2015 | Styles et al. |
| 2008/0245986 A1 | 10/2008 | Arnault et al. |
| 2013/0220317 A1 | 8/2013 | Rittner et al. |

FOREIGN PATENT DOCUMENTS

| | | |
|---|---|---|
| EP | 0 500 407 | 8/1992 |
| FR | 2 353 094 | 12/1977 |
| FR | 2 876 432 | 4/2006 |
| GB | 1 577 943 | 10/1980 |
| RU | 2 486 919 | 7/2013 |
| RU | 143 271 | 7/2014 |

OTHER PUBLICATIONS

French Search Report and Written Opinion for FR 1 760 210, dated Jun. 6, 2018.

Mitra S., et al., "A Design Diversity Metric and Reliability Analysis for Redundant Systems," Proceedings International Test Conference 1999, ITC'99, Atlantic City, NJ, Sep. 28-30, 1999; [International Test Conference], New York, NY: IEEE, US, vol. CONF. 30, Sep. 1, 1999, pp. 662-671.

REGULATING DEVICE, APPARATUS AND METHOD FOR GENERATING BREATHING GAS

CROSS-REFERENCE TO RELATED APPLICATIONS

This application is a § 371 of International PCT Application PCT/FR2018/052042, filed Aug. 9, 2018, which claims § 119(a) foreign priority to French patent application FR 1760210, filed Oct. 30, 2017.

BACKGROUND

Field of the Invention

The invention relates to a regulating device, to an apparatus and to a method for generating a breathing gas.

The invention relates more particularly to a device for regulating breathing gas delivered to a user, notably for an apparatus for generating breathing oxygen on board an aircraft, comprising a gas circuit comprising a main line having at least an upstream end intended to be connected to at least one gas source and a downstream end intended to be connected to at least one user station such as a mask, the main line comprising at least one electromechanical regulating valve configured to regulate the pressure of the gas between upstream and downstream, the circuit comprising a secondary line comprising an upstream end intended to be connected to at least one gas source and a downstream end intended to be connected to the same user station(s), the secondary line comprising at least one auxiliary gas flow regulating member, the device comprising a changeover system configured to control the passage of gas between the upstream and downstream of the circuit via the main line or via the secondary line.

The invention relates in particular to a device for regulating breathing gas for an on-board oxygen generation system (OBOGS).

Related Art

In military aviation in particular, certain systems supplying the users (pilots) with oxygen comprise a main pressure regulator supplying one or more masks at the correct partial pressure of oxygen using a source of gas enriched with oxygen coming from an oxygen concentrator (concentrator of the molecular sieve type for example).

This regulator conventionally has a continuous-flow backup system which bypasses (short-circuits) the main regulator. The main regulator may be made up of two electromechanical valves arranged in series, each of which is capable of cutting off the flow of the other in the event of failure and of providing the regulating function. Failure notably means: an oxygen pressure delivered to the user that is either too low or too high with respect to a setpoint, a disconnection of the user from the concentrator in the event of ejecting from the aircraft, poor operation of the main regulator, an electrical breakdown, a mechanical blockage of the valve, etc.

The regulator delivers the oxygen to the mask at a regulated pressure of between zero and around one hundred millibar with respect to atmospheric pressure, depending on the setpoint (depending on the operational altitude and maximum acceleration for example).

This device offers dilution or overpressure functions in order simultaneously to meet all legislative requirements and control the oxygen consumption.

The backup system of this regulator is provided by a calibrated orifice, incorporated into a controlled valve shutter supplied by a backup cylinder filled with pure oxygen. This backup system can generally be ejected from the aircraft with the pilot.

The latest generations of regulator are supplied either by an on-board oxygen concentrator or by a pure-oxygen gas source.

This known backup system supplies the pilot's mask with a continuous flow of oxygen. This ensures flight safety, in the event of failure of the main regulator, by allowing the pilot to descend back down to a flying altitude that is low enough that he has no need of oxygen, but does not necessarily allow the flight mission to be prolonged.

Another problem with this known system is the risk of creating either an overpressure (excess flow rate in the exhalation phase) or a depression (insufficient flow rate on the inhalation phase requiring a top up with additional air) at the mask, these being potentially unpleasant for the pilot.

SUMMARY OF THE INVENTION

One object of the present invention is to alleviate all or some of the above-mentioned drawbacks of the prior art.

To this end, the device according to the invention, in other respects in accordance with the generic definition thereof given in the above preamble, is essentially characterized in that the auxiliary regulating member of the secondary line is a pneumatic pressure regulator.

Thus, the backup system of the main regulator with volumetric bypass can be replaced by a backup system of the regulated-pressure type (pneumatic regulator in particular) in order to ensure, even in the event of switching over to the backup system, maximum comfort in order to prolong the mission.

Furthermore, embodiments of the invention may comprise one or more of the following features:
- the device comprises an altitude sensor, the pressure regulator of the auxiliary line being a regulator that is controlled in such a way as to regulate the gas pressure according to the altitude measured by the sensor,
- the device comprises an inhibition valve arranged on the secondary line in series with the pneumatic pressure regulator,
- the inhibition valve is manually controlled and/or operated automatically,
- the main line comprises, arranged in series from upstream to downstream, a first changeover valve and an electromechanical regulating valve that is operated in such a way as to regulate the gas pressure,
- the first changeover valve comprises two inlets which are intended to be connected respectively to two distinct gas sources, at least one outlet connected to the electromechanical regulating valve of the main line and a distributor to establish a passage of gas between one of the inlets and said outlet or to isolate any passage between the inlets and said outlet,
- the first changeover valve comprises two outlets respectively connected to the electromechanical regulating valve of the main line and to the pneumatic pressure regulator, the distributor being configured to establish a passage for gas between at least one of the inlets and the outlet connected to the pressure regulator of the secondary line, the device comprises a control member controlling the position of the distributor and able to be actuated manually, allowing the configuration of the distributor to be forced for a passage of gas between at least one of the inlets and the outlet connected to the pressure regulator of the secondary line (8), the first changeover valve is a slide valve or spool valve, the electromechanical regulating valve is a slide valve or spool valve operated by control electronics receiving signals from a pressure sensor in the circuit downstream of said regulating valve, the device comprises two distinct sources of oxygen-enriched gas, of which a first of the sources is at least connected to the upstream end of the main line and of which the second source is connected at least to the upstream end of the secondary line, the second source is also connected to the upstream end of the main line, the device comprises at least one breathing mask connected to the downstream end of the main line and to the downstream end of the secondary line, the downstream ends of the main line and of the secondary line are coincident, the first source comprises an oxygen concentrator, the second source comprises at least one pressurized oxygen reservoir.

The invention also relates to an apparatus for generating breathing oxygen which is intended to be on board an aircraft comprising a gas regulating device according to any one of the features hereinabove or hereinbelow.

The invention also relates to a method for generating breathing oxygen in an aircraft using such an oxygen generation apparatus, the method comprising a transfer of gas via the main line between the gas source and a user station at a regulated pressure of between 0 and 100 mbar with respect to ambient pressure and, in the event of failure of the transfer of gas via the main line, a transfer of gas via the secondary line between the gas source and the user station at a regulated pressure that is fixed or variable via the pressure regulator of the secondary line.

The invention may also relate to any alternative device or method comprising any combination of the features hereinabove or hereinbelow.

BRIEF DESCRIPTION OF THE FIGURES

Further particular features and advantages will become apparent from reading the following description, which is given with reference to the figures, in which.

DETAILED DESCRIPTION OF THE INVENTION

Figure 1:
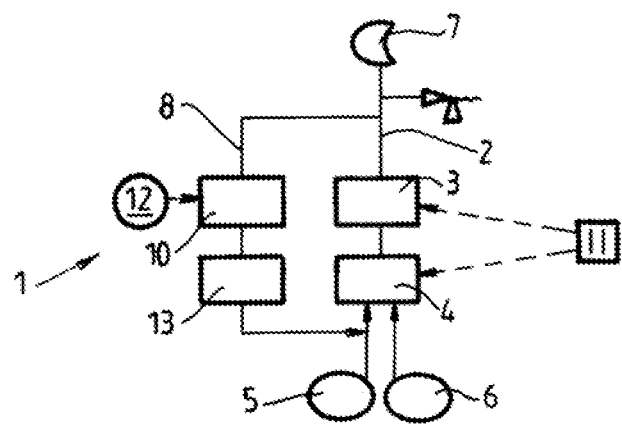
FIG. 1 depicts a diagrammatic and partial view illustrating the structure and the operation of a first embodiment of a regulating device in an oxygen generation apparatus.

The device for regulating a breathing gas depicted in FIG. 1 is incorporated into a breathing oxygen generation apparatus 1 intended, for example, to be carried on board an aircraft (for example an OBOGS).

The regulating device comprises a gas circuit comprising a main line 2 having an upstream end connected, via a changeover valve 4, to two distinct gas sources 6, 5. For example, the two sources 6, 5 may be respectively: an oxygen concentrator 6 producing a gas enriched with oxygen (using molecular sieve and/or membranes or any other suitable system) and a source 5 of pure or concentrated oxygen (oxygen cylinder(s) for example).

The main line 2 comprises a downstream end connected to at least one user station such as a mask 7, for example for a pilot.

Between the changeover valve 4 and the downstream end, the main line 2 comprises an electromechanical regulating valve 3 configured to regulate the pressure of the gas between upstream and downstream.

The electromechanical regulating valve 3 (and/or the changeover valve 4) may be operated by an electronic member 11 comprising a microprocessor. In particular, the electromechanical regulating valve 3 may be operated in such a way as to deliver to the mask a regulated oxygen pressure (comprised for example between zero and 100 mbar on top of atmospheric pressure) which is dependent on the flight conditions (operational altitude and acceleration). To this end, the electromechanical regulating valve 3 and/or the member 11 that operates it may receive a set of signals from suitable sensors (sensing altitude, acceleration, pressure delivered downstream of the valve 3, etc.).

Figure 2:
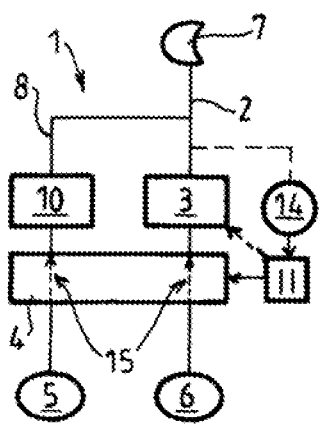
FIG. 2 depicts a diagrammatic and partial view illustrating the structure and the operation of a second embodiment of a regulating device in an oxygen generation apparatus.

Nonlimitingly, the electromechanical regulating valve 3 may comprise all or some of the features of the one described in document EP500407A1. In particular, and as illustrated in FIG. 2, the electromechanical regulating valve 3 may be a slide valve or spool valve operated by control electronics 11 receiving signals from a pressure sensor 14 in the circuit downstream of said regulating valve 3.

Likewise, and nonlimitingly, the changeover valve 4 may comprise all or some of the features of the one described in document EP499505A1. In particular, the first changeover valve 4 may be a valve referred to as a slide valve or spool valve, namely one comprising one or more inlets and one or more outlets and a distributor 15 capable of controlled translational and/or rotational movement which, depending on its position, provides fluidic communication between one or more inlets and one or more outlets.

Conventionally, the circuit has a secondary line 8 (or backup line) comprising an upstream end connected to at least one 5 of the gas sources (cylinder(s)) and a downstream end connected to the same user station(s) 7. As illustrated, the downstream ends of the main line 2 and of the secondary line 8 may be coincident. What that means to say is that the secondary line 8 constitutes a bypass of the main line 2 if need be and notably in the event of malfunctioning of the main line 2.

For example, the oxygen is delivered to the mask 7 via the secondary line 8 in the event of failure of the regulation of the main line 2 (partial pressure too high or too low or in the event of the pilot ejecting and becoming disconnected from the concentrator 6 which remains attached to the aircraft, electrical fault, etc.). This changeover may be commanded by the changeover valve 4.

This secondary line 8 comprises an auxiliary gas pressure regulating member 10, preferably of pneumatic type. For example, a pneumatic pressure regulator 10.

The pneumatic pressure regulator 10 is preferably passive, which means to say mechanical in operation (requiring no electrical power supply). For example, this mechanical pressure regulator comprises pressure regulation by means of a mechanism involving a diaphragm, valve shutter(s), etc. For example, this pressure regulator may comprise a valve or a reducer of the piston and/or diaphragm type, etc.

This auxiliary pneumatic regulator 10 therefore acts as a backup to the electromechanical main regulator 3. The auxiliary regulator 10 may be supplied with gas from a pure-oxygen cylinder 5 (backup cylinder) and/or by the concentrator 6. It therefore delivers the gas to the pilot's mask 7 on demand.

The auxiliary regulator 10 may potentially be slaved to (operated on the basis of) a detection of overpressure or of depression reflecting the breathing of the pilot. This pressure measurement could be achieved for example using the compensation device described in document EP500407A1.

In this way, the (preferably pneumatic) auxiliary regulator 10 can regulate the pressure (and possibly the flow rate) of oxygen sent to the mask 7.

As illustrated schematically in FIG. 1, the apparatus 1 may potentially incorporate an altimetric capsule 12 in the auxiliary regulator 10 to make it possible to add mechanical regulation of the pressure (and/or of the flow rate) as a function of the measured altitude and/or as a function of the demand by the user of the mask 7.

What that means to say is that either the auxiliary regulator 10 provides:
either regulation of pressure to a fixed setpoint (with no altimetric capsule or equivalent)
or regulation to a pressure that is variable according to the altitude and/or according to the demand/acceleration (with altimetric capsule 12 or equivalent).

As a preference, and as illustrated in FIG. 1, in the case where the auxiliary regulator 10 provides pressure regulation as a function of altitude and of demand (acceleration or the like). The device preferably also comprises an inhibition valve 13 making it possible to avoid emptying the backup oxygen cylinder 5 during ill-timed start-ups of the auxiliary regulator 11. This inhibition valve 13 may be a manually and/or automatically operated valve, with a preference for manual instigation.

Thus, under normal circumstances, the changeover valve 4 commands the supplying of the mask 7 with oxygen from the oxygen concentrator 6 and via the electromechanical pressure regulator 3 of the main line 2. In the event of malfunction, the changeover valve 4 may change over the supplying of the mask with oxygen to the oxygen cylinder 5 and via the electromechanical pressure regulator 3 of the main line 2.

In the event of a malfunction of the main line 2, the device may automatically change over the supplying of the mask with oxygen to the oxygen cylinder 5 and via the auxiliary pressure regulator 10 of the secondary line 8.

As illustrated in FIG. 2, to facilitate the changeover between "normal" mode and "backup" mode, the changeover valve 4 may be modified so that it also controls the selection between the electromechanical regulating valve 3 (main line 2) or the auxiliary pressure regulator 10 (secondary line 8).

What that means to say is that the changeover valve 4 provides the changeover between the main line 2 and the secondary line 8 in addition to performing the other functions (changing over between the two oxygen sources 6, 5 to supply the main line 2, etc.).

Thus, the changeover valve 4 may comprise two inlets intended to be connected respectively to the two gas sources (oxygen concentrator 6 and cylinder(s) 5), and two outlets respectively connected to the electromechanical regulating valve 3 of the main line 2 and to the auxiliary pressure regulator 10.

The changeover valve 4 may comprise a mobile distributor 15 able to move (in translation and/or rotation or some other way) configured to as to establish or not establish a passage for gas between at least one of the inlets and the outlet or outlets or to isolate any passage between the inlets and at least one outlet.

Thus, as illustrated in FIG. 2, the distributor 15 may command the supplying of oxygen to the mask 7 by the concentrator 6 via the main line (right-hand arrow in dotted line). Alternatively, the distributor 15 may command the supplying of oxygen to the mask 7 by the cylinder 5 via the auxiliary line 8 (left-hand arrow in dotted line).

In addition, as a preference, the changeover valve 4 has a position for locking the supply of oxygen to the mask 7 by the concentrator 6 via the main line 2 (right-hand arrow in dotted line). This locked position can be obtained using a stop member collaborating with the distributor 15 (a cam or the like). This locked position may be provided for example when the aircraft incorporating this device is on the ground, so as to prevent the cylinder 5 from being used to supply the mask 7.

This locked position can be unlocked (automatically or manually) when the aircraft is in flight. What that means to say is that the locked position whereby the supply of oxygen to the mask 7 is by the concentrator 6 via the main line (right-hand arrow in dotted line) is maintained, but can be changed.

For example, the changeover valve 4 can change over the supply of oxygen to the mask so that it is via the main line 2 from the cylinder 5 (cf FIG. 2: arrow in dotted line illustrating the other status of the distributor 15). What that means to say is that, in another possible configuration, the backup oxygen cylinder 5 can also supply the main line 2.

Likewise, the changeover valve 4 can change over the supply of oxygen to the mask 7 so that it is via the auxiliary line 8 from the cylinder 5 (cf FIG. 2: left-hand arrow in dotted line illustrating another status of the distributor 15). This configuration may be established for example in the event of an electrical fault (for example if the pilot ejects) and/or in the event of a fault with the electromechanical regulating valve 3 of the main line 2.

In one possible variant, the changeover valve 4 may be configured (for example in terms of the travel and/or the geometry of the distributor 15) to allow the backup cylinder 5 to supply oxygen only to the auxiliary line 8 (and therefore not to the main line 2).

Figure 3:
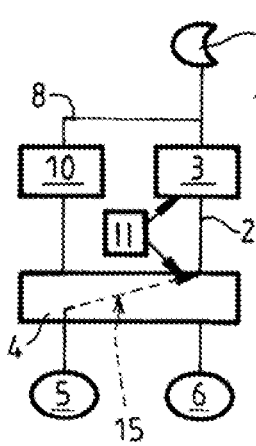
FIG. 3 depicts a diagrammatic and partial view illustrating the structure and the operation of a third embodiment of a regulating device in an oxygen generation apparatus.
Figure 4:
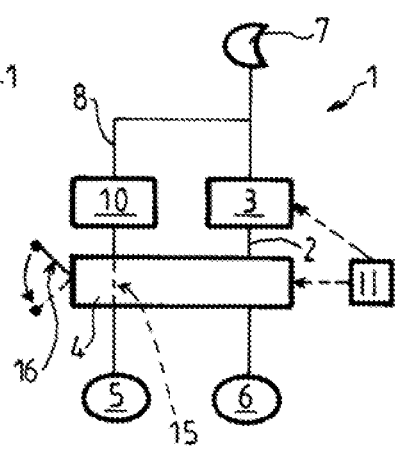
FIG. 4 depicts a diagrammatic and partial view illustrating the structure and the operation of a fourth embodiment of a regulating device in an oxygen generation apparatus.

In addition, as illustrated in FIG. 3, it is possible to incorporate into the changeover valve 4 a manual backup position that allows this valve 4 to be actuated in the event of blockage so as to return to a position in which the auxiliary line 8 is supplied via the cylinder 5. To that end, the device may comprise a member 16 for controlling the position of the distributor 15 which can be actuated manually by the user to make it possible to force the distributor 15 into a configuration for the passage of gas.

The invention may exhibit numerous advantages. In particular, such a design makes it possible to eliminate the potential discomfort of the pilot associated with the backup system of the prior art. According to the invention, in the event of a changeover to the backup oxygen supply system, the pressure regulator 10 makes it possible to ensure a supply of pressure-regulated oxygen. The flow rate will be supplied according to the pilot's demand. Specifically, if the pilot should increase his inhalations, in order to maintain the regulated pressure setpoint (to compensate for the depression generated by the pilot), the auxiliary pressure regulator 10 will increase the flow rate of gas supplied to the mask 7 (and conversely in the event of a lower demand at the mask 7). This pressure regulation allows better user comfort without increasing the electrical power consumption of the system.

The invention may, if appropriate, make it possible to eliminate or reduce a battery pack because when the auxiliary pressure regulator 10 is of the pneumatic type, it does not require an electrical power supply.

The battery pack is generally an alternative source of power to the aircraft electrical network which allows all or some of the functions of the regulator 3 to be maintained in the event of a total or partial electrical fault (in terms of amplitude or in terms of time (powerline disturbance)) with the on-board network.

A battery pack for example allows the pilot to breathe as if he were connected to the aircraft. In particular it allows the "altimetric overpressure" function in the mask 7 at altitude to be maintained.

In the proposed solution, the mechanical pressure regulator 10 may be equipped with a mechanical altimetric capsule 12 allowing the pressure (and/or the flow rate) delivered to the mask 7 to be adjusted according to the ambient pressure experienced by the capsule 12, requiring no electrical power supply.

In addition, it is possible to add other functions to the changeover valve 4 so as to be able also to select the backup modes and direct the flow of oxygen (cylinder 5 and/or concentrator 6) toward the auxiliary pressure regulator 10.

In addition, the various valves 4, 3 may be configured to compensate for the pressure drops in the circuit between the pressure sensors and the user station (mask 7), cf for example document EP500407A1.

The use of a valve according to the examples given hereinabove may allow very broad pressure regulation in a relatively compact size. In addition, the examples of valves (notably a slide valve or spool valve) make it possible to combine the features of a monostable valve and of a bistable valve into a single component, with the possibility of regulating pressure, see also FR2876432A1.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for regulating breathing gas delivered to a user, comprising a changeover system and a gas circuit that comprises a main line and a secondary line, wherein:
   the main line has at least an upstream end configured to connect to at least a first gas source, the main line further comprises a downstream end configured to connect to at least one user station, and the main line further comprises at least one electromechanical regulating valve configured to regulate the pressure of the gas on either side of said at least one electromechanical regulating valve;
   the secondary line comprises an upstream end configured to connect to at least a second gas source, the secondary line further comprises a downstream end configured to connect to said at least one user station, and the secondary line further comprises at least one pneumatic pressure regulator; and
   the changeover system is configured to control passage of gas along a path selected from the group consisting of the main line or the secondary line.

2. The device of claim 1, further comprising an altitude sensor, wherein said at least one pneumatic pressure regulator is controlled to regulate gas pressure according to an altitude measured by the altitude sensor.

3. The device of claim 1, further comprising an inhibition valve arranged on the secondary line in series with said at least one pneumatic pressure regulator.

4. The device of claim 3, wherein the inhibition valve is manually controlled.

5. The device of claim 3, wherein the inhibition valve is operated automatically.

6. The device of claim 3, wherein the inhibition valve is manually controlled and operated automatically.

7. The device of claim 1, wherein the main line further comprises, arranged in series, a first changeover valve and a electromechanical regulating valve that is operated in such a way as to regulate a pressure of gas flowing through the electromechanical regulating valve, wherein the first changeover valve is disposed upstream of the electromechanical regulating valve.

8. The device of claim 7, wherein the first changeover valve comprises a first inlet configured to connect to the first gas source, a second inlet configured to connect to the second gas source, at least one outlet connected to the electromechanical regulating valve of the main line, and a distributor to establish a passage of gas from a source to a location, wherein the source is selected from the group consisting of the first gas source or the second gas source, wherein the location is selected from the group consisting of the first inlet, the second inlet, or said at least one outlet.

9. The device of claim 8, wherein the at least one outlet comprises a first outlet connected to the electromechanical regulating valve and a second outlet connected to the pneumatic pressure regulator, the distributor being configured to establish a passage of gas between at least one of the first and second inlets and the second outlet.

10. The device of claim 8, further comprises a control member, wherein the at least one outlet comprises a first outlet connected to the electromechanical regulating valve and a second outlet connected to the pneumatic pressure regulator, the control member controlling a position of the distributor and being adapted to be actuated manually in order to place the distributor in a first position in which a passage of gas is allowed between the first inlet and the second outlet or a second position in which a passage of gas is allowed between the second inlet and the second outlet.

11. The device of claim 7, wherein the first changeover valve is selected from the group consisting of a slide valve or spool valve.

12. The device of claim 1, wherein the electromechanical regulating valve is operated by control electronics receiving signals from a pressure sensor in the circuit downstream of said electromechanical regulating valve, wherein the electromechanical regulating valve is selected from the group consisting of a slide valve or a spool valve.

13. The device of claim 1, further comprises the first gas source and the second gas source, wherein the first and second gas sources are distinct oxygen-enriched gases, the first gas source is connected to the upstream end of the main line, and the second gas source is connected to the upstream end of the secondary line.

14. The device of claim 13, wherein the second gas source is also connected to the upstream end of the main line.

15. The device of claim 1, further comprises at least one breathing mask, the at least one breathing mask being the at least one user station, wherein the at least one breathing mask is connected to the downstream end of the main line and also to the downstream end of the secondary line.

16. The device of claim 1, wherein said device is an apparatus for generating breathing oxygen on board an aircraft.

17. The device of claim 1, wherein each of the at least one user station is a mask.

18. An apparatus for generating breathing oxygen on board an aircraft, comprising the device of claim 1.

19. A method for generating breathing oxygen in an aircraft using the apparatus of claim 18, said method comprising the step of transferring gas via the main line between one of the first and second gas sources and at least one user station at a regulated pressure of between 0 and 100 mbar with respect to ambient pressure, wherein, in the event of failure of said gas transfer via the main line, gas is transferred via the secondary line between another one of the first and second gas source and the user station at a regulated pressure that is either fixed or variable via the pressure regulator of the secondary line.

20. The device of claim 8, wherein said distributor is configured to isolate any passage of gas between the inlets and said at least one outlet.

* * * * *